(12) United States Patent
Mahlum

(10) Patent No.: US 6,759,542 B2
(45) Date of Patent: Jul. 6, 2004

(54) PROCESS FOR PREPARING BLOWN VEGETABLE OIL

(75) Inventor: Larry Mahlum, Volga, SD (US)

(73) Assignee: South Dakota Soybean Processors, Volga, SD (US)

( * ) Notice: Subject to any disclaimer, the term of this patent is extended or adjusted under 35 U.S.C. 154(b) by 75 days.

(21) Appl. No.: 10/287,058

(22) Filed: Nov. 4, 2002

(65) Prior Publication Data

US 2003/0065201 A1 Apr. 3, 2003

Related U.S. Application Data

(63) Continuation of application No. 09/790,127, filed on Feb. 21, 2001, now Pat. No. 6,476,244.
(60) Provisional application No. 60/184,476, filed on Feb. 23, 2000.

(51) Int. Cl.$^7$ ................................................. C11B 3/16
(52) U.S. Cl. ........................ 554/183; 554/175; 554/181
(58) Field of Search ................................. 884/175, 181, 884/183

(56) References Cited

U.S. PATENT DOCUMENTS 2,657,224 A    10/1953  Bierke ........................ 260/425
4,609,500 A    9/1986   Strecker ...................... 260/423

FOREIGN PATENT DOCUMENTS

EP    0 405 601 A2    1/1991

*Primary Examiner*—Deborah D. Carr
(74) *Attorney, Agent, or Firm*—McAndrews, Held & Malloy, Ltd.

(57) ABSTRACT

A method for partially refining a crude vegetable oil utilizing physical refining techniques is described. The crude vegetable oil is first degummed by either (1) allowing the crude oil to settle over a period of time, such as twenty days, so that the oil becomes stratified into at least two layers, wherein one layer comprises gums with low oil content and a second layer comprises oil containing only a fraction of the gums originally present and then separating the oil layer from the gum layer, or (2) heating the crude oil to a temperature of about 270–300° F. with agitation and then allowing the crude oil to settle for a period of time until the oil becomes stratified into the at least two layers. The degummed oil is then aerated and agitated while being maintained at a temperature of 170–180° F. for a time period sufficient to obtain a desired oil viscosity. The resulting partially refined oil is suitable for use in industrial applications such as the preparation of urethane foams.

9 Claims, No Drawings

PROCESS FOR PREPARING BLOWN VEGETABLE OIL

This application is a continuation to U.S. patent application Ser. No. 09/790,127, entitled "Process For Preparing Blown Vegetable Oil", filed on Feb. 21, 2001 now U.S. Pat. No. 6,476,344, which claims priority to U.S. Provisional Patent Application Serial No. 60/184,476, filed on Feb. 23, 2000.

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to the refining of crude vegetable oils, and in particular the refining of crude soybean oil, to render the oil useful in industrial applications.

Refined vegetable oils and compounds and materials derived therefrom have a number of uses in industrial applications. For example, refined soy oil can be used as an ecological alternative to products derived from petroleum that are used in making urethane foams. One difficulty with using such refined vegetable oils, however, is that the costs associated with the refining process make the refined vegetable oils to expensive to use in industrial applications.

Crude oil that has been extracted from the oil-containing vegetable material is typically a dark colored turbid liquid that needs to be further refined to convert it to a useful oil product. There are a wide variety of known techniques for refining crude vegetable oils into useful vegetable oils. Because most of the refined vegetable oils are intended for human consumption, most of the conventional methods and equipment used in vegetable oil processing are directed to removing impurities that can contribute to unwanted flavor, color, odor, and other undesirable properties. Such impurities include phosphorus-containing contaminants such as hydratable and non-hydratable phospholipids, free fatty acids, color bodies and trace minerals. The typical known vegetable oil refining process involves several steps, such as degumming, neutralization (alkali refining), bleaching and deodorization. The degumming step typically involves adding water and usually other chemicals, such as phosphoric acid, to the crude oil, heating and agitating the mixture for a period of time (approximately 10–30 minutes) at temperatures of about 50–70° C., and then subsequently centrifuging the mixture to separate the water and oil. The degumming step can be repeated to further reduce the amount of phospholipids in the crude oil.

The degummed oil is then subjected to several additional refining steps to remove the other unwanted components such as free fatty acids, color bodies, and other impurities. In these refining steps, the free fatty acids are saponified, the oil is washed to remove the soaps, neutralized and further washed to remove excess chemicals and soaps. The oil is then bleached to remove color bodies and then finally deodorized. Since an alkali is used to saponify the free fatty acids, the process is known as alkali or chemical refining.

The capital cost associated with equipment to practice these chemical refining steps is very high. For example, centrifuges and filtering equipment, which can be expensive to maintain, are typically used to separate the oil from the washing water. Chemical refining also involves many steps which are cumbersome and which inherently contribute to oil losses, since each of the refining steps produces a residue which carries with it a certain quantity of usable oil, thus decreasing the yield of the refined oil.

Because of the high cost of equipment, the high operating expense and the losses of product oil, there has been a desire in recent years to practice a process commonly referred to as physical refining. In a physical refining process, crude oil, which has been subjected to several pretreatment processing steps, is brought to an elevated temperature (250° C. or more) in a vessel operated under vacuum. Steam is sparged into the oil during treatment. Temperature and retention time conditions are selected such that the free fatty acids and other impurities are volatilized and distilled off. The treated oil is then typically cooled and given a post bleach to further lighten the color of the oil.

Although physical refining offers the advantage of reduced capital and operating costs, it still requires the crude oil to be subjected to substantial pretreating steps, including the addition of chemicals to remove at least some of the impurities in the crude oil. These substantial pretreating steps add to the cost of the physical refining process, making the fully refined oil resulting from the process nevertheless still economically undesirable for industrial applications.

The present invention contemplates a physical refining process that eliminates the substantial pretreatment steps and results in a partially refined vegetable oil that is useful in industrial applications.

SUMMARY OF THE INVENTION

It is an object of the invention to provide an economical process for refining vegetable oils so that they can be used in industrial applications.

It is another object of the invention to provide a process for refining vegetable oils that limits or eliminates yield losses.

It is a further object of the invention to provide a process for refining vegetable oils that eliminates the need for chemical pretreatment of the crude oil.

These and other objects and advantages of the invention will become apparent to one skilled in the art who has the benefit of this application and the prior art.

One aspect of the invention is a process for partially refining a crude vegetable oil, such as soybean oil. The crude oil is first degummed by allowing the oil to sit for a period of time sufficient to allow phospholipids, free fatty acids and other impurities to settle out of the oil. The oil is separated from the impurities, and heated to a first temperature while being agitated in order to evaporate excess moisture from the vegetable oil. Then the oil is allowed to cool to a second temperature within the range of about 170–180° F. and pressurized air is introduced into the oil as it is being cooled to aerate the oil. The temperature of the oil is then maintained within the temperature range of 170–180° F. and the oil is simultaneously aerated and agitated until the partially refined oil achieves a desired viscosity.

Another aspect of the invention is a process for partially refining a crude vegetable oil wherein an alternative degumming procedure is employed. The alternative degumming procedure comprises steam heating the crude vegetable oil to a first temperature of about 270–300° F. while agitating the oil. Once the oil reaches the first temperature, the heat and agitation are turned off and the oil is allowed to settle into layers, wherein the bottom layer contains a substantial amount of the phospholipid and free fatty acid impurities. The oil is separated from the impurities and then subjected to the same cooling and temperature maintenance steps previously stated to obtain a partially refined oil having a desired viscosity.

DETAILED DESCRIPTION OF THE PREFERRED EMBODIMENTS

It has now been determined that a partially refined vegetable oil suitable for use in industrial applications such as in making urethane foams can be obtained from a physical refining process. It should be understood that the refining process of the present invention is performed on crude oil which has already been extracted from the oil-bearing vegetable matter, and is not applied to the oil-bearing vegetable matter itself. Although the process is applicable to a variety of crude vegetable oils, its predominant commercial concern is directed to soybean oil and will be particularly discussed with reference to this oil.

The crude soybean oil obtained from extraction is put into a storage tank and allowed to settle for a period of time sufficient to allow the fines and other insoluble impurities from the extraction process, as well as the hydratable and non-hydratable phospholipids or gums present in the crude oil, to settle to the bottom of the tank. In general, this settling step takes about 20 days. During this time, the phosphorous content of the crude oil decreases because the gums settle to the bottom of the tank.

After sealing, the crude oil is then pumped into a blowing tank, taking care not to pump off the bottom layer which contains the gums and other impurities.

The degummed crude oil is then heated in the blowing tank to a temperature sufficient to cause the excess moisture present in the oil to bubble up through the oil to the top of the tank. A sufficient heating temperature is in the range of about 260–270° F., with 270° F. being an optimum temperature. Temperatures above 270° F. tend to cause darkening or scorching of the oil, while temperatures below about 260° F. are not hot enough to efficiently cause the excess moisture to move through the oil.

As the oil is heated it is continuously agitated to promote movement of the moisture through and out of the oil. The equipment used to accomplish the heating and agitation of the oil can be any heating and agitation equipment known to those knowledgeable in soybean processing. For example, it has been found useful in the present process to equip the blowing tank with steam coils positioned near the bottom of the tank to accomplish the heating of the oil and to equip the blowing tank with an impeller to accomplish the agitation.

Once the temperature of the oil in the blowing tank reaches about 270° F., the heat and agitation are turned off, and the oil is then aerated by introducing air under pressure into the blowing tank. Although a variety of aeration equipment could be used to accomplish the aeration step, one useful design is to equip the tank with perforated pipe that is placed near the bottom of the blowing tank.

The air is introduced into the oil at a sufficient pressure and at a sufficient rate to cause the air to contact and penetrate all the crude oil in the tank. An optimum air pressure for the introduced air is about 120 pounds per square inch and an optimum rate is about 30 cubic feet per minute.

It is desirable to have a small amount of moisture present in the oil, such as about 0.03 to 0.05% moisture. During the heating and agitation step, too much moisture can be evaporated from the oil such that the moisture content drops below the range of about 0.03–0.05%. It is then necessary to bring the moisture level up to the optimum range, and this can be accomplished by utilizing humid air in the aeration step. The amount of humidity is not critical; ambient air at ambient temperature typically contains sufficient humidity to raise and maintain the moisture level of the oil at about 0.05%. If additional moisture does not need to be added to the oil, i.e. the moisture level is already at about 0.05%, the air can be dried in a dryer prior to being introduced into the blowing tank.

While the oil is being aerated, the heat is turned off and the temperature of the oil is allowed to drop. When the oil temperature reaches about 170° F., the amount of air introduced into the oil is increased to about 130 cubic feet per minute to insure thorough contact and penetration of the air into the oil. The temperature of the oil is then maintained within the range of 170–180° F. during the remainder of the aeration step. In order to maintain a temperature within this range, the heating coils may be turned on as needed to increase the temperature. Alternatively, if the temperature rises above 180° F., water can be introduced into the coils to lower the temperature to the desired range of 170–180° F.

Although the oil could be maintained at temperatures outside the 170–180° F. range, such temperatures are not optimum. At temperatures below 170° F., the viscosity of the oil is higher and the air does not disperse as well through the oil. If the oil is maintained at temperatures higher than 180° F. there is a danger that the oil will polymerize and darken in color.

During the aeration step it is desirable to agitate the oil to promote thorough mixing of the air with the oil. However, care must be taken to make sure that the oil does not reach temperatures over about 270° F. because such temperatures can lead to scorching of the oil. Therefore, before air is introduced during the aeration step, the agitator is turned off, since the combination of agitation and aeration could lead to increases in the temperature of the oil above about 270° F. due to natural friction. As the temperature of the oil drops during the aeration step, the agitator can be turned on intermittently to insure mixing of the air with the oil while minimizing the risk of increased temperatures. In general, an agitation time of about 5 minutes every hour is sufficient. Once the oil temperature drops to about 170° F. the agitation can be constant because the danger of the oil reaching too high of a temperature as a result of the frictional forces is minimal.

Aeration and agitation of the oil are continued until the oil reaches a desired viscosity. In general, the desired viscosity will depend upon the desired use for the partially refined oil. Viscosities ranging from about 30–40 poise are typical desired viscosities. Once the oil reaches the desired viscosity, the aeration and agitation are stopped and the oil is allowed to cool. The oil tends to polymerize as it is cooling and thereby increase in viscosity. To prevent the oil from polymerizing, a blanket of nitrogen gas can be introduced into the blowing tank. The oil resulting from the process of the present invention has the following characteristics:

| | |
|---|---|
| Free Fatty Acid | 3.8 to 2% |
| Moisture | 0.05 to .006 |
| Acid Value | 1.4 to 3.6 |
| Hydroxyl Value | 50 to 125 |

-continued

| | |
|---|---|
| Phosphorus | 25 ppm to 110 ppm |
| Gardner Color | 5 |

The oil resulting from the process of the present invention is a low cost oil suitable for use in industrial applications. Unlike prior art chemical and physical refining processes, the process of the present invention avoids the addition of chemicals to refine or pretreat the crude oil, thereby eliminating expensive equipment such as centrifuges and eliminating additional processing steps.

In some production situations there may be a demand for the partially refined oil product that makes it impractical to utilize a lengthy settling period such as 20 days. In such situations, an alternative degumming procedure can be utilized in the present invention instead of using a settling period to remove the gums and other impurities.

In the alternative degumming procedure, the extracted crude oil is pumped directly into the blowing tank. Once in the blowing tank, the crude oil is heated with live steam introduced through the perforated pipes. An optimum steam pressure is about 150 p.s.i. The oil is heated to a temperature that is sufficient to reduce the viscosity of oil such that the phospholipids, free fatty acids and other impurities can settle out of the oil. In general a temperature in the range of about 270–300° F. is a sufficient heating temperature, with 300° F. being preferred. Temperatures within this range provide an optimum oil viscosity and typically do not result in scorching or darkening of the oil because of the presence of all the impurities. As the crude oil is heated it is continuously agitated to insure thorough mixing of the steam and the oil.

Once the temperature reaches about 300° F., the heat and agitation are turned off and the oil is allowed to settle in the tank. During settling, the phospholipids, free fatty acids and other impurities drop to the bottom of the blowing tank where they can be drained off. In general, it takes about five hours for the impurities to settle to the bottom of the tank.

After the phospholipids, free fatty acids and other impurities are drained off, the oil is then subjected to the same aeration step discussed previously in connection with the crude oil that is allowed to settle for 20 days. Again, the air is introduced at an air pressure of about 120 pounds per square inch, and at a rate of about 30 cubic feet per minute. In order to insure that the moisture level in the oil is in the range of about 0.03–0.05%, it may be necessary to use dried air rather than humid air in the aeration step.

When the temperature of the oil reaches about 170° F., the amount of air introduced is increased to about 100 cubic feet per minute so that the air can thoroughly contact and penetrate the oil. The temperature of the oil is maintained within the range of 170–180° F. for the remainder of the aeration step.

As previously discussed, it is desirable to agitate the oil during the aeration step. Again, the oil is agitated intermittently as the temperature is allowed to drop from about 300° F. to a temperature in the range of 170–180° F., and continuously agitated while the oil temperature is maintained within the range of 170–180° F.

Once the oil reaches a desired viscosity, the aeration and agitation are stopped and the oil is allowed to cool. The oil resulting from the process employing the alternative degumming procedure has the following characteristics:

| | |
|---|---|
| Free Fatty Acid | 2.75 to 2% |
| Moisture | .05 to .006 |
| Acid Value | 2 to 3.6 |
| Hydroxyl Value | 50 to 72 |
| Phosphorus | 5 ppm to 15 ppm |
| Gardner Color | 5 |

Utilizing the alternative degumming procedure results in an oil having a lower phosphorus content because the steam used in the degumming procedure draws more phosphorus out of the oil that if the oil is degummed through settling alone.

Numerous modifications may be made to the foregoing process without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. A method of partially refining a vegetable oil containing gums and other impurities comprising the steps of:
   a) permitting the vegetable oil to settle over a period of time such that the oil becomes stratified into at least two distinct layers, with one layer comprising gums with a low oil content and a second layer comprising oil containing a portion of the gums originally present in the oil;
   b) separating the oil layer from the gum layer;
   c) heating and agitating the oil layer;
   d) aerating the oil with air under pressure for a time period sufficient to achieve a desired viscosity; and
   e) permitting the oil to cool to ambient temperature to obtain the partially refined vegetable oil.

2. The method of claim 1 wherein the air is introduced at a pressure of about 120 pounds per square inch.

3. The method of claim 1 wherein the air is introduced at a rate of about 30 to about 130 cubic feet per minute.

4. The method of claim 1 wherein the viscosity of the aerated oil is from about 30 to 40 poise.

5. The method of claim 1 wherein the oil is cooled under a nitrogen blanket.

6. A method of partially refining a vegetable oil containing gums and other impurities comprising the steps of:
   a) heating the vegetable oil to a temperature in the range of 270–300° F.;
   b) agitating the vegetable oil;
   c) permitting the heated vegetable oil to cool and to settle over a period of time such that the oil becomes stratified into at least two distinct layers, with one layer comprising gums with low oil content and a second layer comprising oil containing a fraction of the gums originally present in the oil;
   d) separating the gum layer from the oil layer;
   e) aerating the oil layer with air under pressure for a time period sufficient to achieve a desired viscosity; and
   f) permitting the oil layer to cool to ambient temperature to obtain the partially refined vegetable oil.

7. The method of claim 6 wherein the oil is agitated during the aeration step.

8. The method of claim 6 wherein steam is used to heat the vegetable oil.

9. The method of claim 8 wherein the steam is introduced at a pressure of about 150 pounds per square inch.

* * * * *